US006957060B1

United States Patent
Sharp

(10) Patent No.: US 6,957,060 B1
(45) Date of Patent: Oct. 18, 2005

(54) METHODS AND APPARATUS FOR ESTABLISHING A CALL IN A CELLULAR MOBILE NETWORK

(75) Inventor: Iain Sharp, Maidenhead (GB)

(73) Assignee: Nortel Networks Limited, St. Laurent (CA)

( * ) Notice: Subject to any disclaimer, the term of this patent is extended or adjusted under 35 U.S.C. 154(b) by 548 days.

(21) Appl. No.: 09/995,926

(22) Filed: Nov. 28, 2001

Related U.S. Application Data

(60) Provisional application No. 60/253,596, filed on Nov. 28, 2000.

(51) Int. Cl.[7] .......................... H04M 1/66; H04M 1/68; H04M 3/16
(52) U.S. Cl. ................... 455/410; 455/414.1; 455/411; 455/432.1; 455/435.1; 455/550.1; 455/558
(58) Field of Search ............................. 455/404.1, 410, 455/411, 432.1, 435.1, 321, 550.1, 552.1, 455/558; 380/278, 279

(56) References Cited

U.S. PATENT DOCUMENTS

| | | | |
|---|---|---|---|
| 5,884,168 A * | 3/1999 | Kolev et al. | 455/432.1 |
| 6,125,283 A * | 9/2000 | Kolev et al. | 455/552.1 |
| 6,366,791 B1 * | 4/2002 | Lin et al. | 455/567 |
| 6,397,054 B1 * | 5/2002 | Hoirup et al. | 455/404.1 |
| 6,415,159 B1 * | 7/2002 | Miyashita | 455/558 |
| 6,415,160 B1 * | 7/2002 | Wichmann | 455/558 |
| 6,480,725 B2 * | 11/2002 | Cassidy et al. | 455/558 |
| 6,711,262 B1 * | 3/2004 | Vatanen | 380/277 |

* cited by examiner

Primary Examiner—Stephen D'Agosta
(74) Attorney, Agent, or Firm—Barnes & Thornburg

(57) ABSTRACT

It is desirable to allow mobile stations such as mobile telephones or cell phones to connect to a wireless cellular network even without the presence of a SIM card or other identification information. This is desirable for example, for access to emergency services. By configuring the mobile station to be able to populate replies to request for identification information during call set up which are received from the network, it is possible to avoid redesigning the network while providing "SIM-less" access to the network.

8 Claims, 2 Drawing Sheets

METHODS AND APPARATUS FOR ESTABLISHING A CALL IN A CELLULAR MOBILE NETWORK

RELATED APPLICATION

This application is the non-provisional filing of provisional U.S. Patent Application Ser. No. 60/253,596, filed Nov. 28, 2000.

FIELD OF THE INVENTION

This invention relates to a method of setting up a call in a communications network, to a cellular radio network and to a communications system comprising a plurality of mobile stations and a network.

BACKGROUND OF THE INVENTION

Mobile stations such as those for use with the GSM and UMTS standards are required to provide unique identities and other information stored in a SIM card (which is usually contained within the mobile station) in order to access the network. The protocols used in such networks are designed to provide functions such as subscription checking and authentication. This ensures that a mobile station should be permitted access to the network (for example so that the correct person can be billed for usage of the network) and also provides a degree of privacy using encryption techniques for the data (voice or otherwise) transferred during the call.

Presently, although the hardware forming the mobile station (for example a mobile telephone or cell phone) contains a unique identity, it is the information contained in the SIM which allows the mobile station to gain access to the network. Thus a user may change mobile phones and generally speaking, as long as the SIM is transferred from the old phone to the new phone, network access will still be permitted. This arrangement has clear commercial advantages for a user and furthermore allows facilities such as SIM card roaming to be provided by network operators and mobile phone providers.

However, a consequence of the arrangements permitting authentication, information and mobile subscriber identity information being held in the SIM card is that a mobile station is usually unable to gain access to the network without a SIM card. Whilst this may appear desirable to prevent fraud, it is undesirable when it is wished to make a call, for example, to the emergency services. In this situation, it is desirable to allow a call to be set up with the minimum of restrictions. Therefore, it is desirable to allow a call to be set up using a mobile station into which a SIM card has not been installed.

This has been achieved for the GSM standard by providing a special protocol which allows a mobile station to be "authenticated" to the network without using information which would normally be carried on the SIM.

However, the use of special procedures incurs costs for network operators and mobile telephone suppliers. This cost is incurred even though emergency calls are relatively rare and are not revenue generating. Thus there is a desire to provide a low cost solution to the need for the set up of emergency calls using a mobile station which does not have a SIM card.

In the context of this application, the term "authentication" is used more broadly than the simple exchange of authentication keys. This term is used to describe any steps which permit a mobile station to gain communicative access to a cellular wireless communications network.

SUMMARY OF THE INVENTION

In order to support SIM-less access to the network it is proposed that a mobile station without a SIM uses standardised and default identities in place of those which would normally be provided by the SIM. This allows the mobile station to populate normal signalling messages with this or these default values and thereby gain service on the network using normal procedures.

Thus in accordance with a first aspect of the invention there is provided a method of setting up a call in a communications network using a mobile station in the absence of a SIM card, comprising obtaining default information from the mobile station which is stored elsewhere than on a SIM card and using the said information to carry out substantially standard call set up procedures in a cellular mobile communications network.

In a second aspect of the invention there is provided a mobile station for use in a cellular mobile radio network, comprising a SIM card reader for receiving a SIM card, mobile authentication means arranged to interact with the network to set up a call via the network, and an identity database arranged to hold default identity data, the mobile authentication means being arranged to access the identity database in the absence of a SIM card in order to obtain identity information to use during interaction with the network during call set-up.

In a third aspect, the invention provides a cellular radio network comprising, network authentication means, and call set up means, the network authentication means being arranged to recognise default identification data and to initiate limited functionality call set up via the call set up means responsive to the default identity data.

In a further aspect, the invention provides a communications system comprising a plurality of mobile stations and a network operable to provide wireless communications services to the mobile stations, at least one of the mobile stations including a default identity value which is used by the network to provision a sub-set of the wireless communications services.

Other aspects and features of the present invention will become apparent to those ordinarily skilled in the art upon review of the following description of specific embodiments of the invention in conjunction with the accompanying figures.

DETAILED DESCRIPTION OF THE INVENTION

Figure 1A:
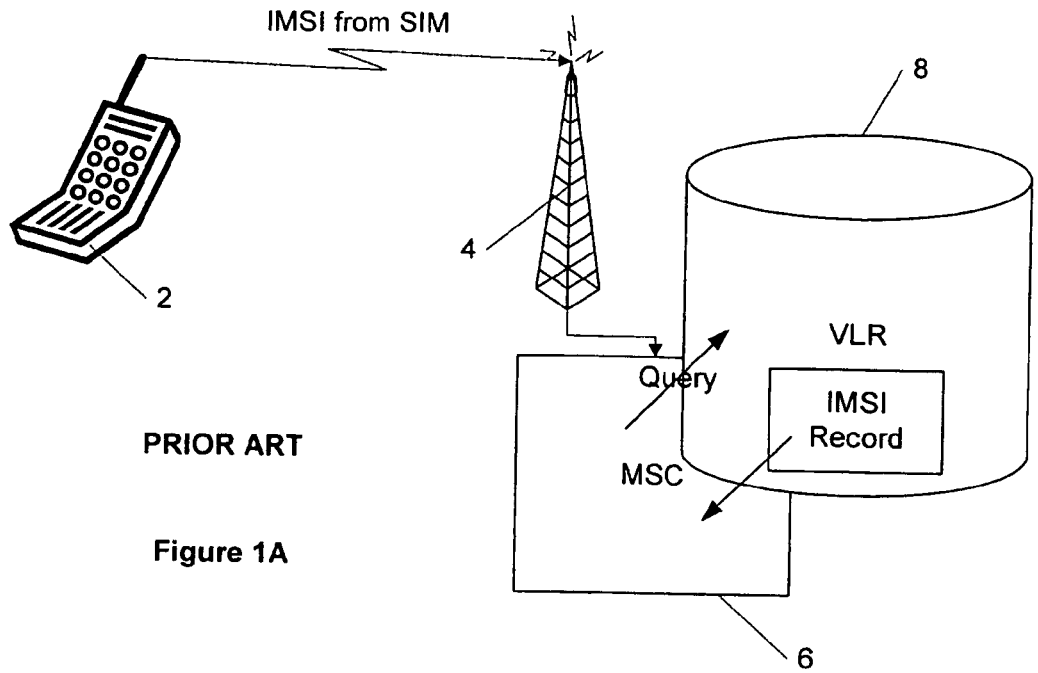
FIG. 1A is a block diagram showing conventional access to an MSC.

With reference to FIG. 1A, a mobile station 2 is shown initiating a connection to a base station antenna 4 with the object of being authenticated with a mobile switching centre 6 to allow data communications to be carried between the mobile station and a network, such as a telephone network (not shown). The steps and messages which must be passed between the mobile station and the network are well defined in the applicable standards. However generally, the mobile station 2 must at least supply an international mobile subscriber identity (IMSI) which is stored on the SIM card physically contained within the mobile station and electrically coupled thereto. As part of the protocol, for example, the IMSI is passed into the mobile switching centre 6 which queries a database of users (the visitor locator register—VLR) using the IMSI as a user or subscriber identity and in order to determine whether the subscriber is permitted access to the network.

It will be appreciated that typically other authentication steps will be carried out such as the swapping of authentication keys which will be used, in part, to encrypt further communications between the mobile station and the network.

Figure 1B:
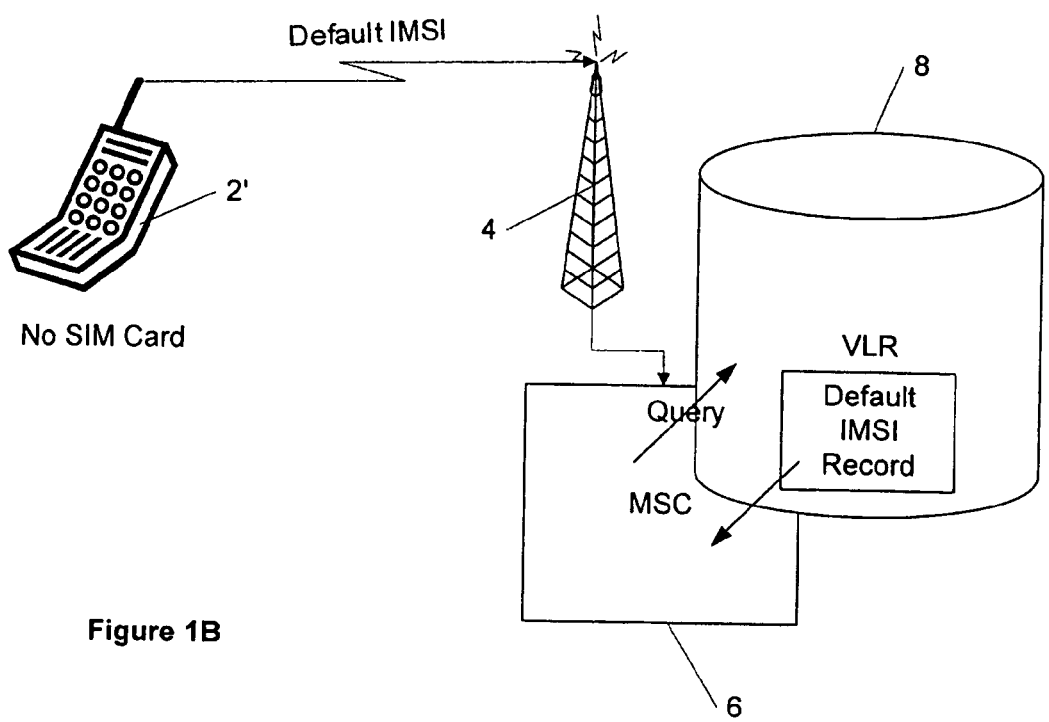
FIG. 1B shows access to an MSC using a mobile station without a SIM card.

As discussed very briefly above, and with reference to FIG. 1B, it will be noted that in the absence of a SIM card, a mobile station 2' has no IMSI to pass to the base station antenna 4. Thus under normal circumstances, it would be impossible for the mobile station 2' to use the network for communication.

However, as discussed above although in general this prevention of access for unauthorised users is desirable, for example, to combat fraud, in special circumstances it may be desirable to allow access to the network. Typical such "special circumstances" would be when it is desired to make an emergency call to the emergency services or to make a non-chargeable call such as to a free phone 1800 or 0800 number. Thus in accordance with a preferred embodiment of the invention, the mobile station 2' has a default IMSI value which it supplies to the network in the absence of an IMSI from a SIM card. This default IMSI is recognised by the VLR 8 which authorises the call set up but with special conditions. Typically, the mobile switching centre will be caused by the special conditions only to allow connections to predefined numbers. The predefined numbers would be those of the emergency services or some other desired authorized call.

Thus, when the default IMSI is supplied by a mobile station 2 such as that shown in FIG. 1B, the VLR 8 provides a default IMSI record for the MSC 6.

In addition to restricted calls which may be made using the default IMSI, the default IMSI may also cause the network to dispense or suppress with additional authentication. For example the normal exchange of authentication keys may be suppressed. This reduces network loading for emergency calls and may also reduce call set up times. However, this also increases complexity since it begins to introduce special procedures with the inherent problems discussed above. Thus in accordance with the invention the mobile station preferably simply has default values for any data which is requested by the network during call set up. These default values are sufficient to allow the call to be set up and may be used by the network to identify a caller who should have restricted functionality (such as restrictions only to calls made to emergency services).

In most cases, communications between different mobile stations are normally dynamically assigned with difference identities. Thus it is permissible to have the same default data values "hard coded" into the mobile station 2'. However, if this is not the case in the particular network protocol or operating procedures, then mobile stations for operation with this invention such as that shown in FIG. 1B, may be provided with one or more of a set of predefined default identities so that the risk of duplicate identities in the network at the same time is reduced or eliminated.

As a further enhancement, in network protocols in which the mobile station 2' is required to store data (which typically would be stored on the SIM card), the mobile station 2' is provided with memory (other than that normally provided in the SIM) in order to store those temporary identities.

It will be noted that FIG. 1B shows the default identities being stored in the VLR. However, the default identities may be stored elsewhere in the network, for example in the serving GPRS switching node (SGSN) or the home subscriber server (HSS).

Furthermore, although the mobile station in FIG. 1B has been identified by the network as being "SIM-less" by virtue of the use of a default IMSI, this need not be the identifier. Other default data required during the call set up interaction may also indicate to the network, that a "SIM-less" mobile station is requesting call set up.

Furthermore, in order to avoid the manufacturing complexity of producing each mobile station with a unique default identity, the network may instead use a unique temporarily assigned identity which is assigned during call setup, The temporary identity may be drawn from a pool managed by the network or may be allocated using a pseudo-random algorithm which minimises the possibility of a clash between different mobile stations. This could, for example, be based on the International Mobile Equipment Identity (IMEI) which should be unique for each mobile station. In this way, it is possible to use mobile stations which do not have unique ('hardwired') default identities.

Figure 2:
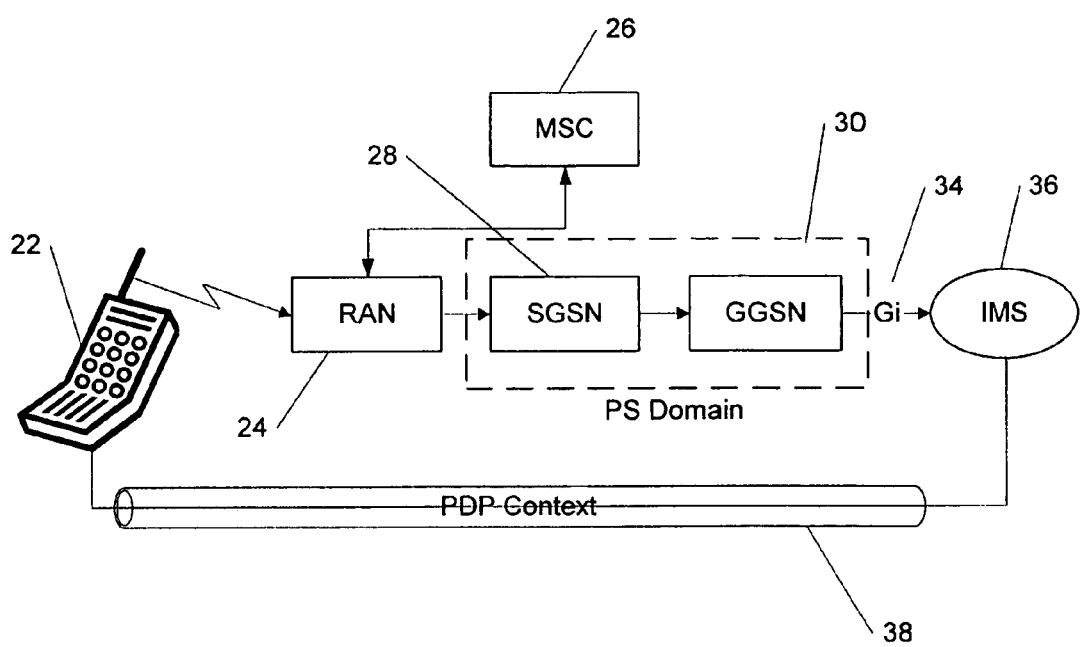
FIG. 2 is a block diagram of a GPRS implementation.

With reference to FIG. 2, an implementation of a preferred embodiment in the invention for general packet radio services (GPRS) networks is shown.

A mobile station 22 communicates with the radio access network (RAN) 24 layer of the network. A mobile switching centre 26 deals with circuit switched data such as voice data and an SGSN 28 deals with packet switched data in the packet switched (PS) domain 30.

For packet switched data, the SGSN communicates with a gateway GPRS switching node (GGS) 32 which sends data to the appropriate subsystem via the gateway interface 34.

In the example shown, the mobile station 22 is setting up a packet switched connection to the so-called IP multimedia subsystem (IMS) 36. This may for example be used to initiate a telephone call using the session initiation protocol (SIP).

During normal call setup, the mobile station 22 provides an IMSI and various other authentication protocol exchanges in order to establish a so-called packet data protocol (PDP) context 38. This is in effect a "tunnel" through which the mobile station can transparently, transfer data packets to the far end of the tunnel and receive data packets from the far end of the tunnel without being concerned about the underlying subsystems.

Hitherto, no protocols have been defined to allow SIM-less access to a network such as that shown in FIG. 2. However, the invention may be applied equally well to this network. By providing the mobile station 22 with default identifying and authentication information, it is possible for the network to authenticate the mobile station 22 in an entirely conventional manner and, if necessary, to restrict functionality for the mobile station based on the default identities which are supplied by it. Thus using the general principle of allowing the mobile station to have sufficient information built into it to be able to populate the protocol request during authentication and call set-up, the design of the network is simplified and it is merely necessary to provide certain default data on a mobile station to provide SIM-less network access, for example, connection to emergency services.

What is claimed is:

1. More than one mobile station for use in a cellular mobile radio network, said cellular mobile radio network being configured to require a mobile station to include a SIM card to connect it, each mobile station comprising
   (a) a SIM card reader for receiving a SIM card,
   (b) mobile authentication means arranged to interact with the network to set up a call via the network, and
   (c) an identity database arranged to hold default identity data, the mobile authentication means being arranged to access the identity database in the absence of a SIM card in order to obtain identity information to use during interaction with the same communications network during call set up, each mobile station having different respective default identity data which permits the network to distinguish between mobile stations when authentication occurs in the absence of a SIM card wherein the network provides limited functionality to the mobile station as a consequence of the use of the default information during call set up, the functionality being limited to the setting up of calls to a predetermined number.

2. More than one mobile station according to claim 1 wherein the SIM card contains an IMSI determining said mobile station's call set up procedures and said default information is a predetermined IMSI.

3. More than one mobile station according to claim 2 wherein the predetermined number is for the emergency services.

4. More than one mobile station according to claim 1 wherein the predetermined number is for a non-chargeable number.

5. More than one mobile station for use in a cellular mobile radio network, said cellular mobile radio network being configured to require a mobile station to include a SIM card to connect it, each mobile station comprising
   (a) a SIM card reader for receiving a SIM card,
   (b) mobile authentication means arranged to interact with the network to set up a call via the network, and
   (c) an identity database arranged to hold default identity data, the mobile authentication means being arranged to access the identity database in the absence of a SIM card in order to obtain identity information to use during interaction with the same communications network during call set up, each mobile station being arranged to be temporarily assigned different respective default identity data which permits the network to distinguish between mobile stations when authentication occurs in the absence of a SIM card, wherein the network provides limited functionality to the mobile station as a consequence of the use of the default information during call set up, the functionality being limited to the setting up of calls to a predetermined number.

6. More than one mobile station according to claim 5 wherein the SIM card contains an IMSI determining said mobile station's call set up procedures and said default information is a predetermined IMSI.

7. More than one mobile station according to claim 5 wherein the predetermined number is for the emergency services.

8. More than one mobile station according to claim 5 wherein the predetermined number is for a non-chargeable number.

* * * * *